United States Patent [19]
Kumar

[11] Patent Number: 5,136,539
[45] Date of Patent: Aug. 4, 1992

[54] ADDER WITH INTERMEDIATE CARRY CIRCUIT

[75] Inventor: Sudarshan Kumar, Portland, Oreg.

[73] Assignee: Intel Corporation, Santa Clara, Calif.

[21] Appl. No.: 285,202

[22] Filed: Dec. 16, 1988

[51] Int. Cl.⁵ .................................. G06F 7/50
[52] U.S. Cl. .......................... 364/787; 364/788
[58] Field of Search ................... 364/787, 788, 784

[56] References Cited

U.S. PATENT DOCUMENTS

| | | | |
|---|---|---|---|
| 3,100,836 | 8/1963 | Paul et al. | 364/788 |
| 3,553,446 | 1/1971 | Kruy | 364/788 |
| 4,584,661 | 4/1986 | Grundland | 364/787 |
| 4,623,982 | 11/1986 | Ware | 364/788 |
| 4,639,888 | 1/1987 | Nussbaecher | 364/788 |
| 4,811,272 | 3/1989 | Wolrich et al. | 364/788 |

Primary Examiner—Tan V. Mai
Attorney, Agent, or Firm—Blakely, Sokoloff, Taylor & Zafman

[57] ABSTRACT

An metal-oxide-semiconductor (MOS) partitioned carry lookahead adder fabricated from a plurality of four bit slice blocks. Each block provides four sum signals and provides a block carry signal. The blocks are organized into groups of optimum size with logic in each group to generate a group propagate signals. Each block has a block carry line with a single transistor connected between the input and output terminals of the block. The blocks employ an intermediate carry circuit for computing sums in place of full adders. In addition, there is a main carry line with transistors controlled by the group propagate signals. For a 32 bit adder, the maximum pass gate delay in the carry chain is three pass gates.

13 Claims, 6 Drawing Sheets

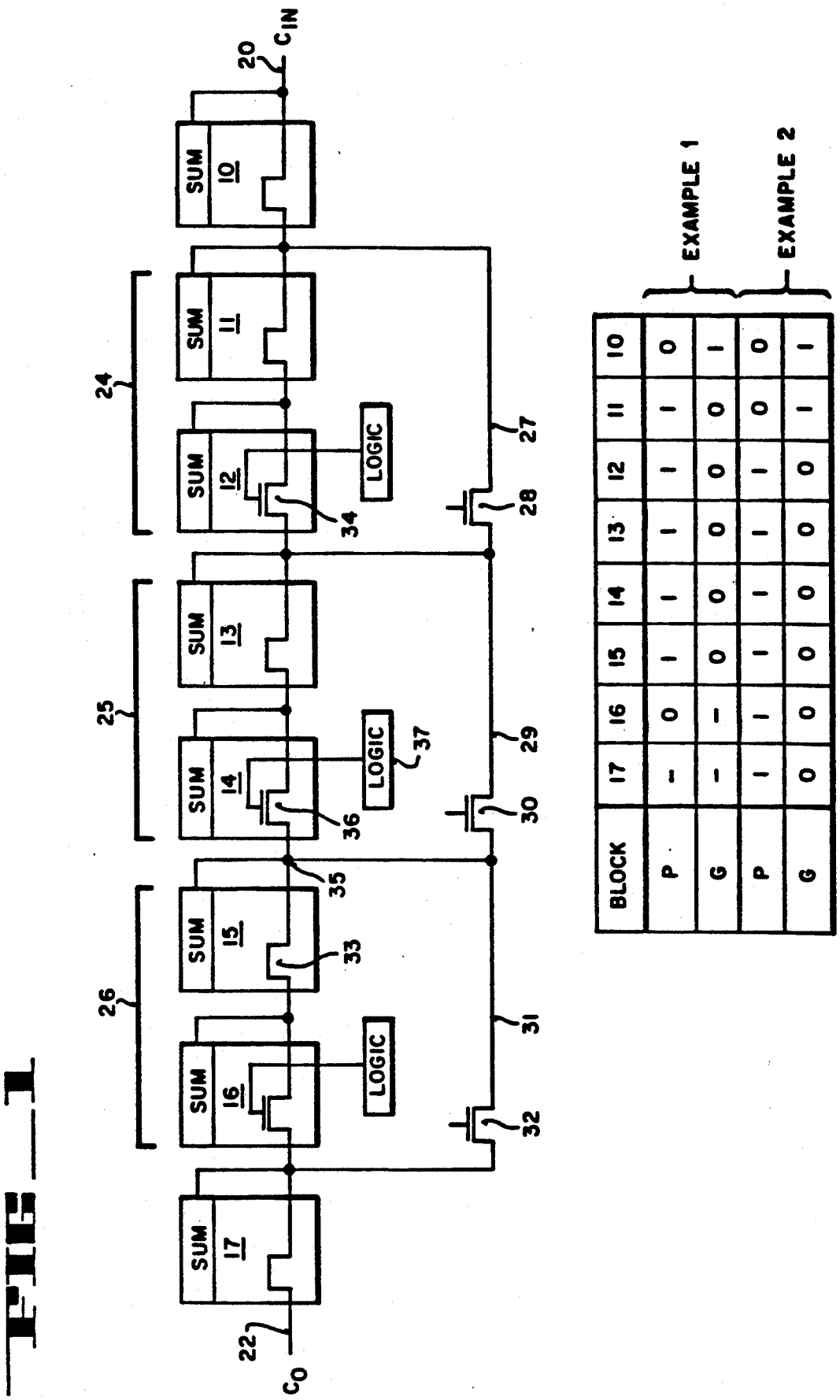

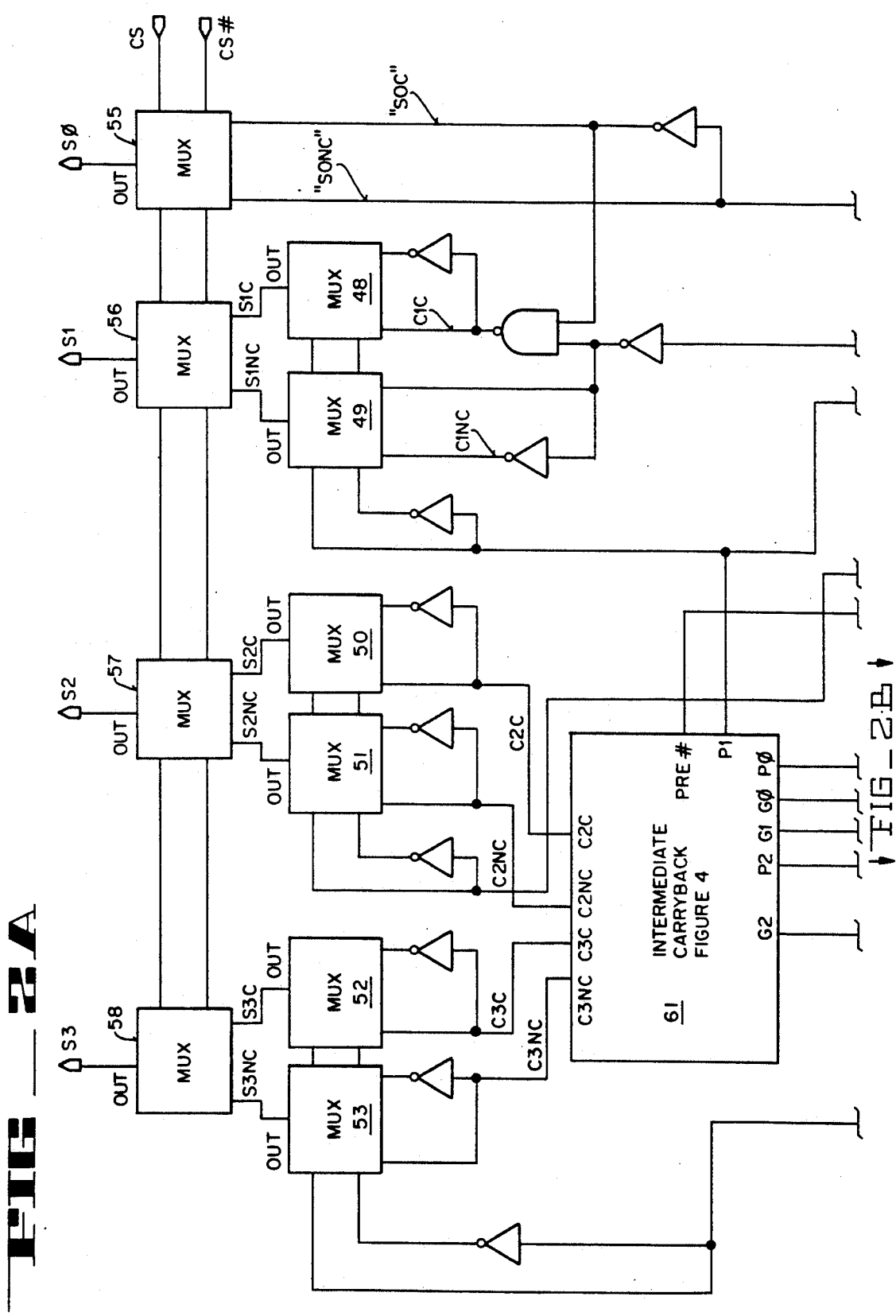

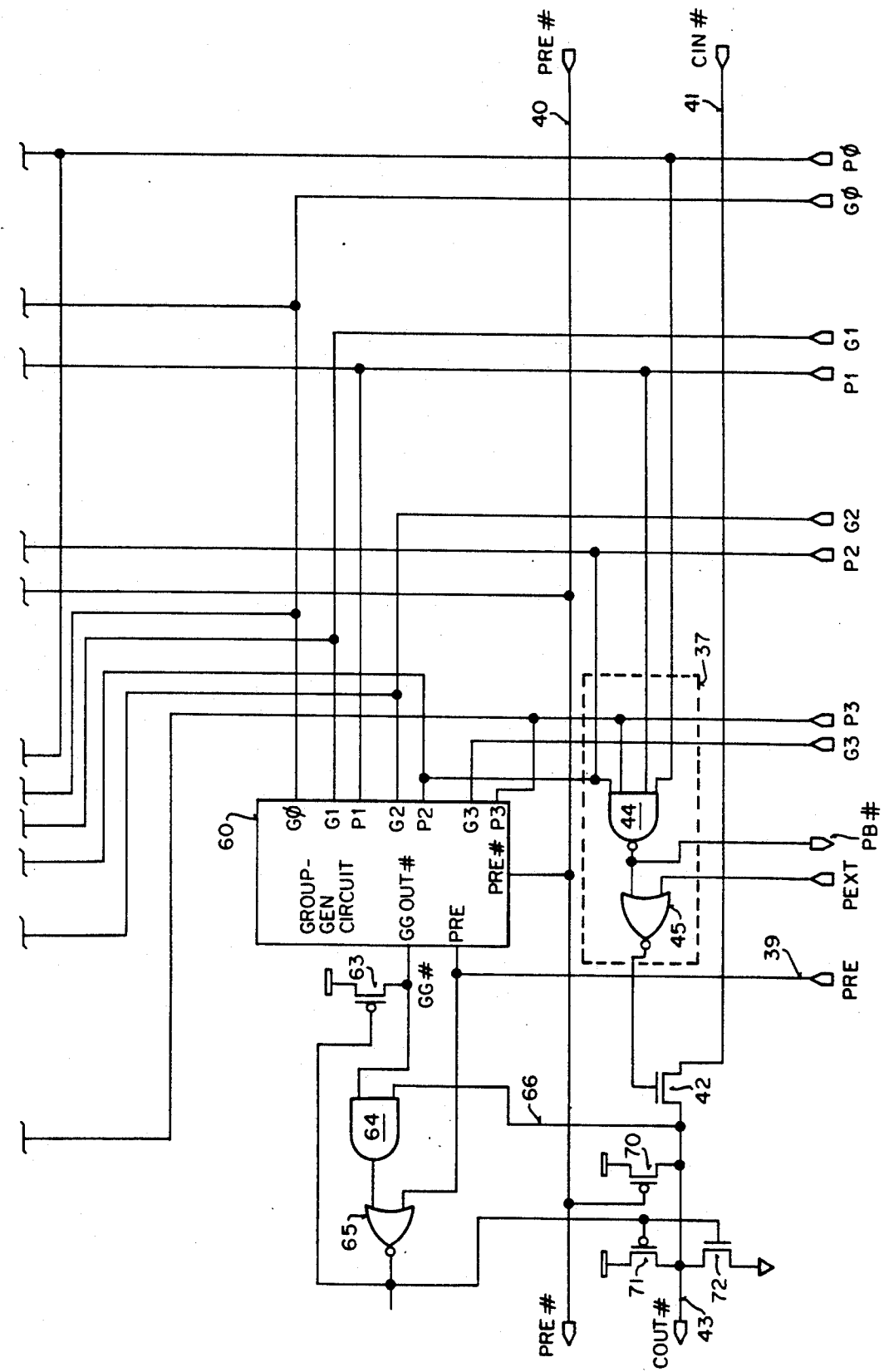
FIG_2B

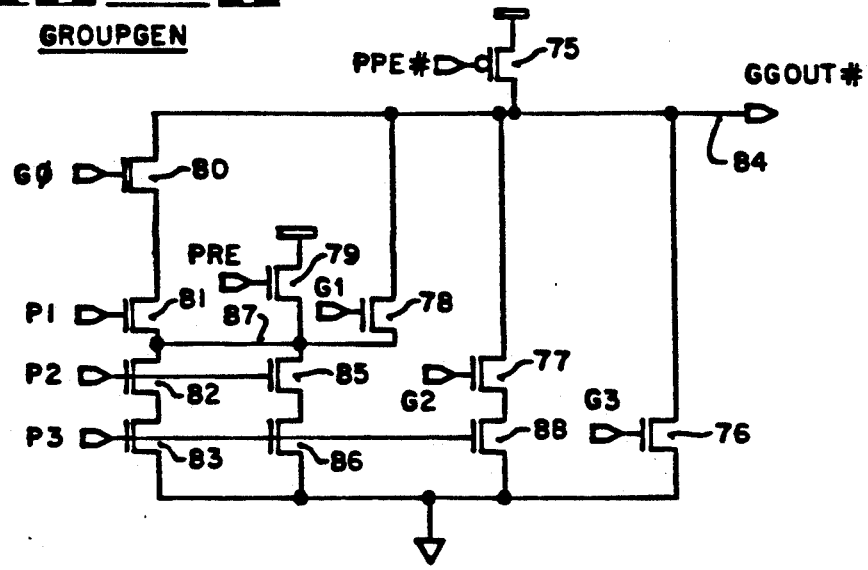
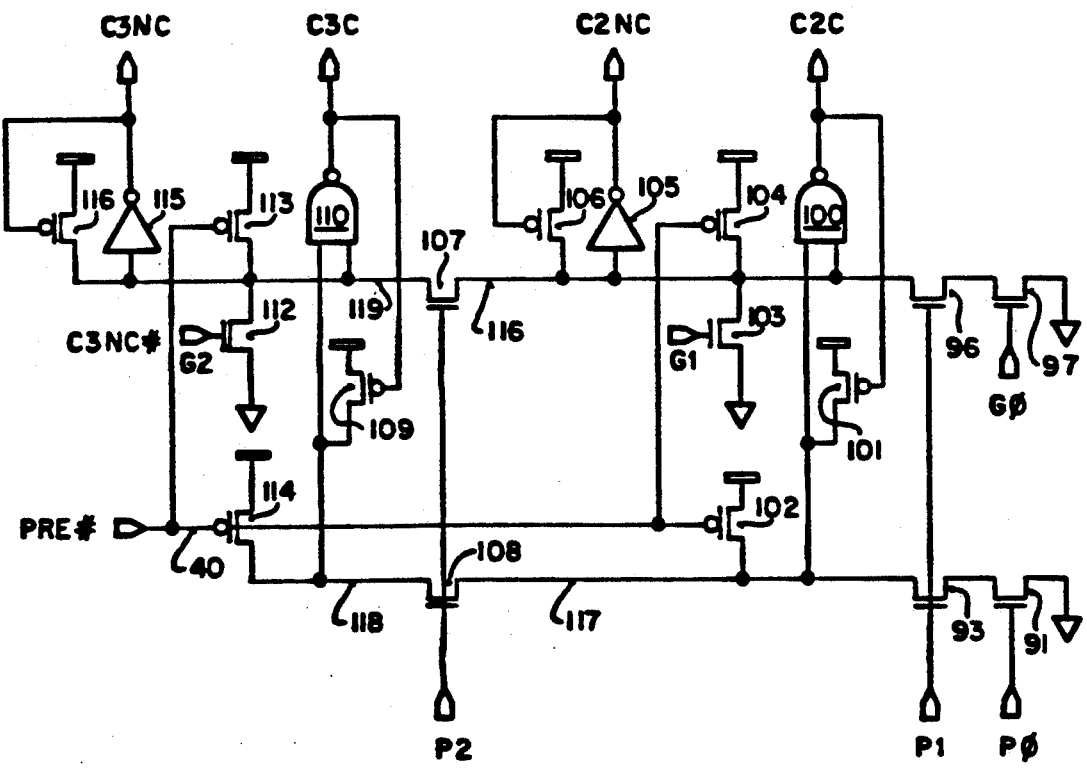

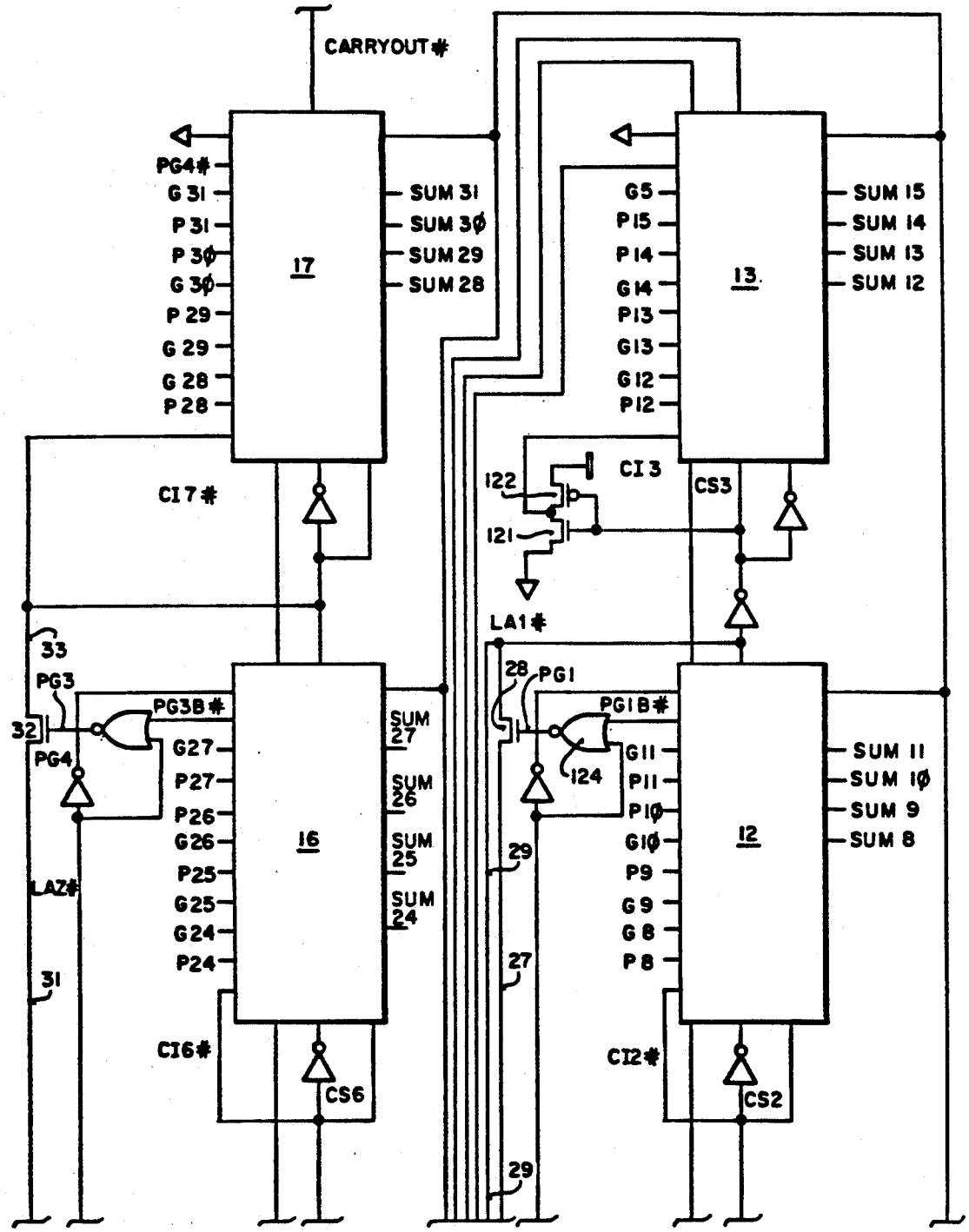
FIG_5A ADDER
↓ FIG_5B ↓

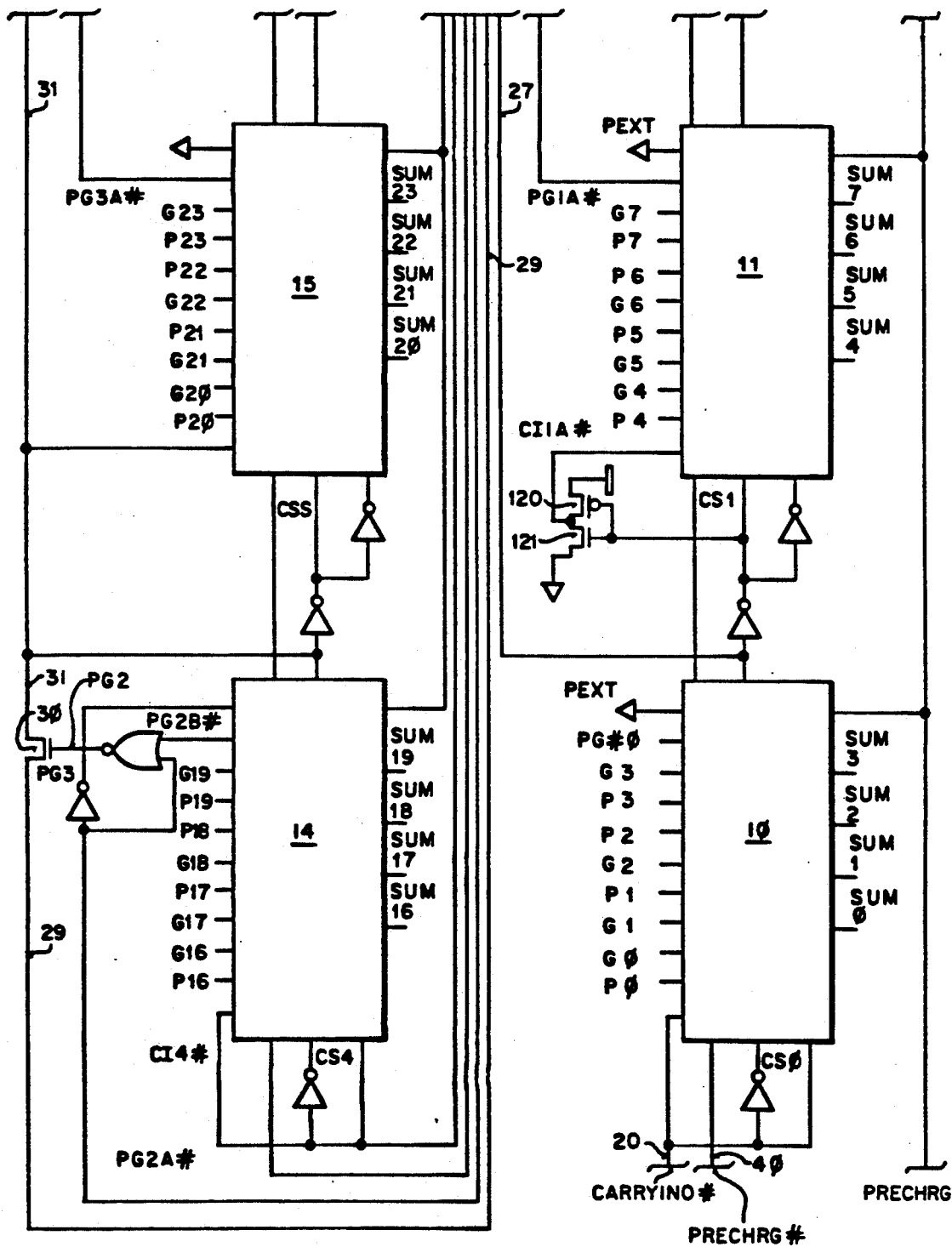

ADDER WITH INTERMEDIATE CARRY CIRCUIT

BACKGROUND OF THE INVENTION

1. Field of the Invention

The invention relates to the field of digital (binary) adders, particularly those employing carry lookahead.

2. Prior Art

Fundamental to the operation of virtually all digital microprocessors is the function of digital (i.e., binary) addition. Addition is used not only to provide numerical sums that a user is conscious of, but also in the implementation of numerous logic functions. In a typical microprocessor, many adders are used for these functions. When two digital words are added, the carry bit that results from the addition of the lesser significant bits must be considered. This can easily be done by rippling a carry signal as the addition is performed. A problem with this, particularly for large words (e.g., 32 bits) is that substantial time is required to ripple the carry signal through the entire addition chain. And since the adders are often performing logic functions in critical time paths, the time needed to ripple the carry signal can slow up the microprocessor. This problem is dealt with in the prior art with carry lookahead circuits, skip-carry circuits and with different partitioning of group circuitry. These topics are discussed in U.S. Pat. No. 4,737,926.

The present invention is an improved carry lookahead adder in that fewer delays are encountered along critical paths in the adder. The adder therefore provides substantial improvement in terms of speed of operation when compared to prior art adders. Moreover, full adders which are often cascaded in prior art adders to form groups, are replaced with a novel circuit which develops intermediate carries.

The adder of the present invention is an improvement of an adder currently used in the Intel 386 microprocessor.

SUMMARY OF THE INVENTION

A semiconductor adder is described which employs carry lookahead and is organized into a plurality of blocks. Each of the blocks receive a carry-in signal and provide a carry-out signal. In particular, a circuit is described for providing N output sum signal for the blocks. The circuit is used in lieu of the full adders typically used in prior art adders.

A first means receives the propagate signals P0, P1 ... Pn and the generate signals G0, G1 ... Gn. A second means coupled to this first means provides two sets of carry signals for at least Cn and C(n−1) from at least some of the propagate and generate signals. These sets of carry signals are provided independent of the state of the carry-in signal. That is, one of the sets of carry signals is valid if a carry-in signal is in a first state and the other of the sets of carry signals is valid if the carry-in signal is in a second state.

A third means which in the currently preferred embodiment comprises a plurality of multiplexers provides two sets of sum signals for at least the sums Sn and S(n−1) by utilizing at least the Cn and C(n−1) carry signals. Again, one set of the sum signals is valid if the carry-in signal is in a first state and the other of the sets of the sum signals is valid if the carry-in signal is in a second state.

Fourth means which in the currently preferred embodiment comprises another set of multiplexers is coupled to the third means. The fourth means selects between the two sets of sum signals as a function of the carry-in signal.

Other aspects of the present invention will become apparent from the following detailed description.

BRIEF DESCRIPTION OF THE DRAWINGS

FIG. 1 is a general block diagram providing an overview of the present invention.

FIG. 2A is a first portion of an electrical schematic of a four bit slice block of the adder used in the present invention.

FIG. 2B is a second portion of an electrical schematic which when joined with FIG. 2A provides the entire electrical schematic for the four bit slice block.

FIG. 3 is an electrical schematic of the group generate circuit shown in FIG. 2B.

FIG. 4 is an electrical schematic of the carry block circuit shown in FIG. 2A.

FIG. 5A and FIG. 5B when joined together are a block diagram of the presently preferred embodiment of the invented adder.

DETAILED DESCRIPTION OF THE INVENTION

A metal-oxide-semiconductor (MOS) digital adder is described. In the following description numerous specific details are set forth such as specific circuits (e.g., specific gates) in order to provide a thorough understanding of the present invention. It will be obvious, however, to one skilled in the art that the present invention may be practiced without these specific details. In other instances, well-known circuits have been shown in block diagram form in order not to obscure the present invention in unnecessary detail.

The adder of the present invention is preferably fabricated employing complementary MOS technology. The specific technology employed in fabricating the adder is not critical to the present invention and any one of a plurality of well-known processes may be used to realize the present invention.

OVERVIEW OF THE PRESENT INVENTION

Referring to FIG. 1, the present invention will be better appreciated if the simplified block diagram of FIG. 1 and its operation are understood. In the presently preferred embodiment, the adder is a 32 bit adder, hence the following description is for a 32 bit adder. In the present invention, a plurality of identical 4 bit slice blocks are used. This simplifies the layout of the adder. One of these blocks is shown in detail in FIGS. 2A, 2B, 3 and 4. These blocks are shown in FIG. 1 as blocks 10, 11, 12, 13, 14, 15, 16, and 17. Each block receives four Pn and Gn signals, and a carry-in signal and provides sum, carry-out, block propagate and block generate signals. The blocks are connected in series as shown in FIG. 1 with the carry-output terminal of one block being connected to the carry-input terminal of the next block. The blocks are further partitioned into groups. Block 10 itself is a group (group 0). Blocks 11 and 12 shown by bracket 24 comprise group 1. The blocks 13 and 14 shown by bracket 25 comprise group 2; blocks 15 and 16 shown by bracket 26 comprise group 3, and finally the last group, group 4 comprises the block 17.

The adder of FIG. 1 includes a main lookahead carry line which extends from the carry-output of block 10 to the carry-input of block 17. This line is divided into three sections, sections 27, 29 and 31. Each section of the main lookahead carry line includes a field-effect transistor coupled into the section in a pass gate connection. Specifically, section 27 includes transistor 28, section 29 includes transistor 30 and section 31 includes transistor 32. (These transistors are formed as parts of each section such that signals flow between the source and drain regions of the n-channel enhancement mode field-effect devices under control of the potential on the gate.) Each section of the main carry line interconnects the carry-out terminal of the nth group to the carry-in terminal of the n+2 group. For example, section 27 connects the carry-out terminal of block 10 of group 0 to the carry-in terminal of block 13 of group 2.

The groups represented by brackets 24, 25 and 26 each generate a group propagate signal. This signal is used to control the transistors 28, 30 and 32, respectively. Thus, for instance, blocks 11 and 12 provide a block propagate signal which is used to generate the group propagate signal; this group propagate signal controls the gate of transistor 28. Also, each group includes logic which decouples the carry-out terminal from an internal (block) carry line. This is used to reduce the capacitance loading on the lookahead carry line and allow signals to more rapidly propagate along this line. For example, logic 37 which is incorporated within the block 14, determines when the conditions for propagating a carry for the group have been met, and in this event, transistor 36 is off. This decouples the node 35 from the internal carry line of block 14 thereby reducing capacitance. At the same time, it allows the group generate signal of block 14 to more easily be coupled onto the carry-out terminal.

In FIG. 1 two examples are shown which explain the operation of the adder of FIG. 1 and the more complete diagram of the adder of FIGS. 5A and 5B. In the table included with FIG. 1, propagate and generate signal levels are shown for the blocks 10–17 for two examples. For example 1, block 10 has a propagate signal equal to 0 and a generate signal equal to 1; block 11 has a propagate signal equal to 1 and a generate signal equal to 0. For this example, a carry-in signal on line 20 does not propagate through block 10, however, block 10 generates a carry signal. This carry signal is coupled onto section 27 of the main lookahead carry line. Both blocks 11 and 12 generate propagate signals, hence transistor 28 conducts and the carry signal is coupled through transistor 28 to block 13. Blocks 13 and 14 both generate propagate signals and hence, transistor 30 conducts and the carry signal is coupled to block 15. Block 15 generates a propagate signal, however, block 16 does not, and therefore transistors 32 does not conduct. The carry signal is propagated through the internal carry line of block 15 since transistor 33 conducts. This transistor is controlled by the propagate signal of block 15. The propagation of the carry ends at block 16. Importantly, it should be noted that the carry-in signal was coupled through transistors 28, 30 and 33. As will be seen from the detailed schematics these are the only transistors in the carry chain through which the carry signal passes and hence, the propagation time is determined by three pass gate delays for the 32 bit adder shown. This is a substantial improvement over the prior art. (With the present invention, there would be 5 pass gate delays in a 64 bit adder, 6 pass gate delays in an 80 bit adder, etc.)

In the second example of FIG. 1, block 10 does not propagate the carry on line 20, instead, it generates a carry. This carry is coupled to block 11, however, transistor 28 does not conduct. For the conditions shown for blocks 13, 14, 15, and 16 transistors 30 and 32 conduct. A carry output, therefore, from block 12 will propagate through transistors 30 and 32 to block 17. (As will be seen, this carry input to block 17 selects one of two sets of sum signals to provide output sum signals.) Note for this example, that once again a carry signal only has three pass gate delays specifically transistors 34, 30 and 32. This is in fact the maximum number of gate delays that occur (for 32 bit adder) in the carry chain before the sum outputs occur.

OVERVIEW OF FOUR BIT SLICE BLOCK

Each block, such as blocks 10–17 receive four propagate input signals and four generate input signals. For the block shown in FIGS. 2A and 2B, these are shown as P0, G0, P1, G1, P2, G2, P3, and G3. The numbering in FIG. 2A is particularly appropriate for block 10; for the 32-bit adder shown in FIGS. 5A and 5B, the numbers are shown as P0 through P31 and G0 through G31. (The P0—P31 and G0—G31 signals are different than the block and group propagate and generate signal designations used particularly in FIGS. 5A and 5B, for clocks and groups. There, for example, PG1A and PG1B designate the propagate signals for the two blocks 11 and 12, respectively, of group 1; PG1 designates the propagate signal for group 1. "GG" designates the group generate signal in FIG. 2B. The Pn and Gn propagate and generate signals are formed in an ordinary manner from the inputs to the adder; that is, from the digital signals which are to be added by the adder. The equations for forming the propagate and generate signals are shown in U.S. Pat. No. 4,737,926 in column 2, as equations 1 and 2. The block and group propagate and generate signals are generated in a manner shown by equations 4 and 5 of this patent; and the sum signals are ordinary sum signals as shown by equation 3 of this patent.

In the prior art where carry lookahead arrangements are used, groups of full adders are used. The full adders are cascaded with each full adder being essentially identical. Such full adders can be used with a grouping shown in FIG. 1, with each block having four full adders in addition to the circuitry for generating the block and group propagate and generate signals.

In the presently preferred embodiment, full adders are not employed in each of the four block slices. Rather, as will be discussed, intermediate carry signals are generated by the carry block circuit 61 of FIG. 2A, and the outputs of this circuit are used along with other logic to provide the sum signals. The group generate signal is produced by the group generate circuitry 60. The block propagate signal is provided by the gate 44 of FIG. 2B with a group propagate signal being developed with logic external to the blocks themselves.

The manner in which the four bit slice of FIGS. 2A and 2B functions can be best understood by first examining a single output, for example, S3. This output is provided by the multiplexer 58. The multiplexer 58 selects between two inputs, one input is the S3 output for the case where the block receives a carry and the other, the case where the block does not receive a carry. These inputs are provided by the multiplexer 52 and 53. The multiplexers 52 and 53 are controlled by the P3 signal. Multiplexer 53 receives as an input the intermediate carry signal and its complement (C3 and C3NC). The multiplexers 52 and 53 along with their controlling signal P3, in effect, provides the sum based on A3, B3, C3 where P3 is equal to the sum of A3 and B3 (assuming A0–A31 and B0–B31 are the signals to be summed by the adder). The circuit 61 solves the equation C3=G2+P2 G1+P2 P1 G0+P2 P1 P0 C0. And, similarly, C2 and C1 are determined. However, since C0 (the input carry to the block) is not necessarily immediately known, C3 is computed both for the carry and non-carry case. It is the multiplexer 58 that selects between these two cases.

DETAILED DESCRIPTION OF FOUR BIT SLICE (BLOCK)

The P0-3 and G0-3 propagate and generate signals, except for P0, are coupled to the block/group generate block 60. This block will be described in detail in conjunction with FIG. 3. The P0, P1, P2, G0, G1 and G2 signals are coupled to the carry block 61. This block shall be described in detail in conjunction with FIG. 4. The outputs of this block (intermediate carries) are used to generate sum signals, as mentioned.

A lower row of multiplexers comprising multiplexers 48, 49, 50, 51, 52 and 53 receive as inputs, true and complement intermediate carry signals. The multiplexers are controlled as illustrated; specifically multiplexers 48 and 49 are controlled by the P1 signals, multiplexers 50 and 51 by the P2 signal and multiplexers 52 and 53 by the P3 signal. These multiplexers act as exclusive OR/NOR gates and hence such gates can be used instead of the multiplexer. For example, multiplexers 52 and 53 can be replaced by an exclusive OR/NOR gate which receives the P3 signal and the C3C signal. The output of the gate (and its complement) are coupled to the multiplexer 58.

An upper row of multiplexers, multiplexers 55, 56, 57 and 58 select between two sets of sum signals. One set of these signals is the correct sum signals if there is no carry-input to the block and the other is the correct sum signals if there is a carry-input. Multiplexers 55, 56, 57 and 58 are controlled by the carry-in signal to the block and its complement (i.e., CS and CS#). In effect, the signal at the carry-in terminal to each block controls these multiplexers for its respective block. This increases the speed of operation since it is not necessary to ripple the carry signal in the block or to generate a carry input for each bit in the block using lookahead. If, for example, there is no carry-in signal, CS is low and multiplexer 56 selects SINC. The P0 signal and its complement are coupled to the multiplexer 55 since there is no intermediate carry signal for the "0" bit of each block.

Numerous nodes in the circuit are precharged and discharged. This precharging and discharging is controlled by the potential on line 39 and its complement on line 40. The precharging/discharging occurs at the beginning of each "add" as is well-known in the prior art.

The carry-input signal is coupled to line 41 and additionally to the upper row of multiplexers. The carry-in terminal (line 41) is coupled to transistor 42. The carry-out terminal (line 43) is also coupled to transistor 42. Thus, the carry-in terminal and carry-out terminal are connected through the source and drain regions of an n-channel transistor 42. (Transistor 42 corresponds to, for example, the transistor 36 shown in FIG. 1.) There is therefore only a single pass gate delay for a carry signal between the carry-in to the carry-out terminal of each block (along the internal block carry line).

The logic circuit 37 of FIG. 1 comprises the NAND gate 44 and NOR gate 45 in FIG. 2B. The NAND gate 44 receives the P0, P1, P2, and P3 signals and provides at its output a propagate signal for the block, shown as PB#. The output of gate 44 is coupled to one input terminal of the NOR gate 45. The other terminal of gate 45 receives the propagate signal from the first block in each group. (This terminal is coupled to ground for the first block in each group. This will be better seen in conjunction with FIG. 5A and FIG. 5B. Note, for example, the grounded terminal PEXT of block 11 in FIG. 5B.) If both blocks in the group have true propagate signals then transistor 42 is off. This provides the decoupling of terminal 43 from terminal 41. Note under these conditions the section of the main carry lookahead line will propagate the carry. Transistor 42, on the other hand, conducts if the propagate signal for the second block in the group (and not the first) has a true propagate signal.

The output of the group generated circuit 60 "GG OUT#" is coupled to one input terminal of the AND gate 64; this terminal is also coupled to the positive potential through the p-channel transistor 63. The other input terminal to the AND gate 64 is coupled to the terminal 43. The output of the AND gate 64 is coupled to one input terminal of the NOR gate 65. The other input terminal to this NOR gate receives the precharge signal, line 39. The output of gate 65 is coupled to the gate of transistor 63 and to the gates of transistors 71 and 72. The transistor 70 is used to precharge the output terminal 43.

First assume that GG# is low, that is, there is a generate signal. The output of gate 64 is low and the output of gate 65 is high. The high potential on the gates of the p-channel transistors 63 and 71 prevents these transistors from conducting. This potential, however, causes transistor 72 to conduct, discharging node 43 thereby meeting the conditions for a carry-out.

If the output of circuit 60 is high, the output of gate 65 will be low, causing transistors 63 and 71 to conduct. This maintains the high input to the gate 64 and clamps the output terminal to a positive potential through transistor 71.

Assume, however, that for these conditions terminal 43 is pulled down by a carry on the main carry lookahead line or through transistor 42 when it conducts (line 41) and CIN# is low. As this occurs, the potential on line 66 drops, causing the output of gate 64 to switch to its low state. This, in turn, causes the output of gate 65 to rise turning on transistor 72 and thereby quickly discharging the terminal 43. This provides an active restore or parallel buffering which speeds up the propagation of the carry.

GROUP GENERATE CIRCUIT

The group generate circuit 60 of FIG. 2B provides the group generate signal as mentioned, in addition to the block generate signal for each of the blocks. The circuit is shown in detail in FIG. 3 and comprises the n-channel transistors 80, 81, 82 and 83 coupled in series between the drain region of transistor 75 and ground. The gates of these transistors receive the G0, P1, P2 and P3 signals, respectively. Transistor 75 precharges the line 84. Transistors 85 and 86 are coupled in series between the source region of transistor 79 and ground. These transistors receive the P2 and P3 signals, respectively, on their gates. The transistor 79 precharges node 87. Transistor 78 is coupled between line 84 and node 87. Its gate receives the G1 signal. Transistors 77 and 88 are coupled between line 84 and ground. The gates of these n-channel transistors receive the G2 and P3 signals, respectively. And, finally, transistor 76 is coupled between line 84 and ground. The gate of this transistor receives the G3 signal.

The logic implemented by this circuit is fairly apparent. If the G3 signal is high, then line 84 will be low indicating that the conditions for the block generate signal exists. Similarly, if $G_2$ is high, and $P_3$ is high, then the conditions are again met for the block generate signal. Or, if the G1 signal is high and the P2 and P3 signals are high, then again the conditions are met for a generate signal. And, finally, if $G_0$ is high and the subsequent propagate signals are high (P1, P2, and P3) the "generate" from the least significant bit is propagated through the four bit slice, causing the conditions for the generate signal to be met.

CARRY BLOCK

The carry block 61 of FIG. 2A is shown in detail in FIG. 4. This circuit receives the P0, P1, P2, G0, G1, and G2 signals and from these signals generates the intermediate carry signals C2 and C3, both for the carry-in and no carry-in case.

The logic implemented by FIG. 4 is fairly straightforward. First, consider the nodes 116, 117, 118 and 119. These nodes are precharged through the p-channel transistors 104, 102, 114 and 113, respectively. Node 117 is coupled to ground if the P0 and P1 signals are high through transistors 91 and 93. Similarly, node 116 is coupled to ground if the G0 and P1 signals are high through transistors 96 and 97. Node 116 which is discharged if the G1 signal is high, is coupled to node 119 through transistor 107 and similarly, node 117 is coupled to node 118 through transistor 108. These transistors conduct if the P2 signal is high. The C3NC signal is the complement of the potential remaining on node 119 since inverter 115 provides this output. Transistor 116 serves to assure that node 119 remains charged if it is not discharged. The C3C signal is provided by the NAND gate 110. This gate receives inputs from nodes 118 and 119. The C2NC and the C2C signals are produced in a similar fashion from inverter 105 and NAND gate 100 with transistor 106 serving to maintain the potential on node 116. Transistors 101 and 109 serve to maintain the potential on nodes 118 and 117.

It should be noted that the intermediate carry signals are essentially simultaneously generated by the circuit, that is, they do not depend on rippling of a carry. This enables the sums to be more quickly generated once the carry-in for the block appears. Also, unlike other circuits, two levels of carry-in dependent sets of signals are computed.

THE PREFERRED EMBODIMENT OF THE ADDER (32 BIT ADDER)

The currently preferred embodiment of the adder is shown in FIG. 5A and 5B. Blocks 10, 11, 12, 13, 14, 15, 16 and 17 are shown connected in a general series arrangement with a carry-out terminal of one block being connected to the carry-in terminal of the next block. Block 10 (group 0) provides a carry-out signal on line 27 which is coupled to the block 11. Block 10 provides the sum signals 0-3 and receives as inputs P0-P3 and G0-G3. The carry-in signal, line 20, provides the CS0 signal and its complement used to control the upper row of multiplexers of FIG. 2A. The carry-out signal is connected to the carry-in terminal of block 11 through two inverters, one comprising transistors 120 and 121.

The blocks 11 and 12 comprise the next group in the adder. The section 27 of the carry line is shown connected to one region of transistor 28, the other region of this transistor is coupled to section 29 of this line. The carry input to the block 13 is coupled through two inverters, one comprising transistors 121 and 122. Again, the carry-out from block 12 provides the CS3 signal and its complement for controlling the multiplexers which provide the sum signals.

The group logic for controlling transistor 28 comprises the NOR gate 124. This gate receives as an input the block propagate signals PG1A# and PG1B#. The output of this gate provides the group propagate signal PG1 which determines whether or not transistor 28 conducts and in turn whether the carry signal is to be propagated along this section of the main carry lookahead line.

The next group which comprises the blocks 13 and 14 are connected in a similar manner and again include group logic which provides the PG2 signal to control transistor 30. The following group comprises blocks 15 and 16 and includes the group logic to provide the PG3 signal which controls transistor 32. The carry output from this group is connected through a single inverter to the final group/block 17.

The operation of the adder of FIGS. 5A and 5B has been described in conjunction with FIG. 1 and as described there, the maximum number of pass gate delays in the carry chain is three for the 32 bit adder.

Thus, an MOS adder has been described which provides a minimum number of gate delays. The adder operates at between 50% to 100% faster than the predecessor adder in the Intel 386 microprocessor.

I claim:

1. In a semiconductor adder employing carry lookahead and organized into a plurality of serially coupled blocks, each of said blocks receiving a carry-in signal and providing carry-out signal and N output sum signals, a circuit for providing at least some of said N output sum signals for said blocks comprising:

a plurality of logic gates for generating two sets of carry signals for $C(N-1)$, $C(N-2)$ and $C(N-3)$ from at least some of the propagate signals P0, P1 ... PN and generate signals G0, G1 ... GN, one of said sets of carry signals being true if said carry-in signal is in a first state, the other of said sets of carry signal being true if said carry-in signal is in a second state, such that a pair of carry signals is generated for each of $C(N-1)$, $C(N-2)$ and $C(N-3)$, wherein one of said carry signals in each of said pairs is true if said carry-in signal is in said first state, the other of said carry signals in each of said pairs being true if said carry-in signal is in said second state, at least one of said carry signals for one of said pairs being derived from the other carry signal is said one pair; and means coupled to said logic gate for providing at least said sum signals $S(N-1)$, $S(N-2)$ and $S(N-3)$ based on the state of said carry-in signal and said sets of carry signals.

2. The circuit defined by claim 1 wherein said plurality of logic gates for generating said carry signals for $CN-1$ and $C(N-2)$ comprise: four sections of gates, the first and second sections being connected through a first pass transistor, and the second and third sections being coupled through a second pass transistor, said first and second transistors being controlled by said P2 signal; precharging means for precharging said four sections; said first section being discharged by said G1, or said P1 and G0 signals; said second section being discharged by said G2 signal; said third section being discharged by said P0 and P1 signals; said first section providing the first state of said C(N−2) signal; said first and third sections providing the second state of said C(N−2) signal; said third section providing the first state of said C(N−1) signal; and, said second and fourth sections providing the second state of said C(N−1) signal.

3. The circuit defined by claim 1 wherein said logic gates simultaneously provide said carry signals C(N−1), C(N−2) and C(N−3).

4. The circuit defined by claim 1 wherein said means comprises two sets of multiplexers, a first of which are controlled by said PN, P(N−1) and P(N−2) signals and the second of which are controlled of said carry-in signal.

5. A method of computing digital sums in a lookahead adder which provides a plurality of output sums and which is organized into a plurality of serially coupled blocks, each of said blocks receiving a carry-in signal and providing a carry-out signal, comprising the steps of:

deriving two sets of carry signals, one of said sets of carry signals being valid if said carry-in signal is in a first state, the other of said sets of carry signals being valid if said carry-in signal is in a second state, such that a plurality of pairs of carry signals are generated, one of said carry signals in each of said plurality of pairs being true if said carry-in signal is in said first state, the other of said carry signals in each of said plurality of pairs being true if said carry-in signal is in said second state, at least one of said carry signals for one of said pairs being derived from the other carry signal in said one pair;

deriving two sets of sum signals from said two sets of carry signals, one set of said sum signals being valid if said carry-in signal is in said first state, the other of said sets of sum signals being valid if said carry-in signal is in said second state; and selecting between said two sets of sums as a function of the state of said carry-in signal.

6. In a semiconductor adder employing carry lookahead and organized into a plurality of serially coupled blocks, each of said blocks receiving a carry-in signal and providing a carry-out signal, a circuit for providing a plurality of output sum signals for said blocks comprising:

first means for receiving P0, P1 . . . PN propagate signals and G0, G1 . . . GN generate signals;

second means coupled to said first means for providing two sets of carry signals for at least CN and C(N−1) from at least some of said propagate and generate signals independently of said carry-in signal, one of said sets of carry signals being valid if said carry-in signal is in a first state, the other of said sets of carry signals being valid if said carry-in signal is in a second state, such that a plurality of pairs of carry signals are generated for at least CN and C(N−1), one of said carry signals in each of said plurality of pairs being true if said carry-in signal is in said first state, the other of said carry signals in each of said plurality of pairs being true if said carry-in signal is in said second state, at least one of said carry signals for one of said pairs being derived from the other carry signal in said one pair;

third means coupled to said second means for providing two sets of sum signals for at least SN and S(N−1) from at least said CN and C(N−1) carry signals, one of said sets of sum signals being valid if said carry-in signal is in said first state, the other of said sets of sum signals being valid if said carry-in signal is in said second state; and fourth means coupled to said third means for selecting between said two sets of sum signals for said fourth means receiving said carry-in signal.

7. The circuit defined by claim 6 wherein said second means includes means for logically ORing at least one of said carry signals of said one pair with the result of logically ANDing said propagate signals to generate the other of said carry signals for said one pair.

8. The circuit defined by claim 7 wherein said fourth means comprises multiplexers controlled by said carry-in signal.

9. The circuit defined by claim 8 wherein said third means comprises an exclusive ORing gate.

10. The circuit defined by claim 9 wherein said third means includes a pair of multiplexers which are controlled by PN.

11. The circuit defined by claims 6 or 8 wherein said carry signals are simultaneously generated by said second means.

12. The circuit defined by claim 11 wherein said fourth means also includes a multiplexer which selects between P0 and its complement.

13. In a semiconductor adder employing carry lookahead and organized into a plurality of serially coupled blocks, each of said blocks receiving a carry-in signal and providing carry-out signal and N output sum signals, a circuit for providing at least some of said N output sum signals for said blocks comprising:

a plurality of logic gates for generating two sets of carry signals for C(N−1), C(N−2) and C(N−3) from at least some of the propagate signals P0, P1 . . . PN and generate signals G0, G1 . . . GN, one of said sets of carry signals being true if said carry-in signal is in a first state, the other of said sets of carry signal being true if said carry-in signal is in a second state, said plurality including four sections of gates, the first and second sections being connected through a first pass transistor, and the second and third sections being coupled through a second pass transistor, said first and second transistors being controlled by said P2 signal;

precharging means for precharging said four sections, said first section being discharged by said G1, or said P1 and G0 signals, said second section being discharges by said P0 and P1 signals, said first section providing the first state of said C(N−2) signal, said first and third sections providing the second state of said C(N−2) signal, said third section providing the first state C(N−1) signal, said second and fourth sections providing the second state of said C(N−1) signal; and means coupled to said logic gate for providing at least said sum signals S(N−1), S(N−2) and S(N−3) based on the state of said carry-in signal and said sets of carry signals.

* * * * *